United States Patent
Liao (10) Patent No.: US 6,282,288 B1
(45) Date of Patent: Aug. 28, 2001

(54) STRUCTURE OF A COMMUNICATION LINE CONNECTING BOX

(76) Inventor: Sheng Hsin Liao, No. 137, San Chun St., Shu Lin Jen, Taipei Hsien (TW)

( * ) Notice: Subject to any disclaimer, the term of this patent is extended or adjusted under 35 U.S.C. 154(b) by 0 days.

(21) Appl. No.: 09/301,759

(22) Filed: Apr. 29, 1999

(30) Foreign Application Priority Data

Apr. 7, 1999 (TW) .................................................. 88205310

(51) Int. Cl.⁷ ..................................................... H04M 1/00
(52) U.S. Cl. ............................................................ 379/438
(58) Field of Search ................................... 379/438, 447; 242/107.11, 107.12, 100.1, 107.2

(56) References Cited

U.S. PATENT DOCUMENTS 5,114,091 * 5/1992 Peterson et al. ................. 242/107.11

* cited by examiner

*Primary Examiner*—Jack Chiang
(74) *Attorney, Agent, or Firm*—Rosenberg, Klein & Lee (57) ABSTRACT

An improved structure of a communication line connecting box comprises a first case, a second case, a spacer, a curled reed, and a conductive wire. The first case is installed with a plurality of check bodies, the second case is installed with a plurality of wedge shape grooves. The first case is combined with the second case. The wedge shape grooves and the check bodies are formed as a check structure. The spacer is pivotally arranged between the first case and the second case. The curled reed is arranged between the spacer and the second case. The curled reed has an inner hook and an outer hook which are connected to the spacer and the second case, respectively. The conductive wire is disposed between the spacer and the first case. The conductive wire is positioned on one side of the spacer. Two ends of the conductive wire penetrated out of the first case and the second case. Two ends of the conductive wire are connected to respective connector. Thereby, an improved structure of a communication line connecting box with a simple structure is formed, which can be assembled easily.

9 Claims, 8 Drawing Sheets

STRUCTURE OF A COMMUNICATION LINE CONNECTING BOX

FIELD OF THE INVENTION

The present invention relates to an improved structure of a communication line connecting box, and especially to a communication ling connecting box for connecting between a communication box and related equipment. The communication line connecting box has a telescopic conductive wire and a simple structure, can be easily assembled and thus is made with a lower cost.

BACKGROUND OF THE INVENTION

Figure 1:
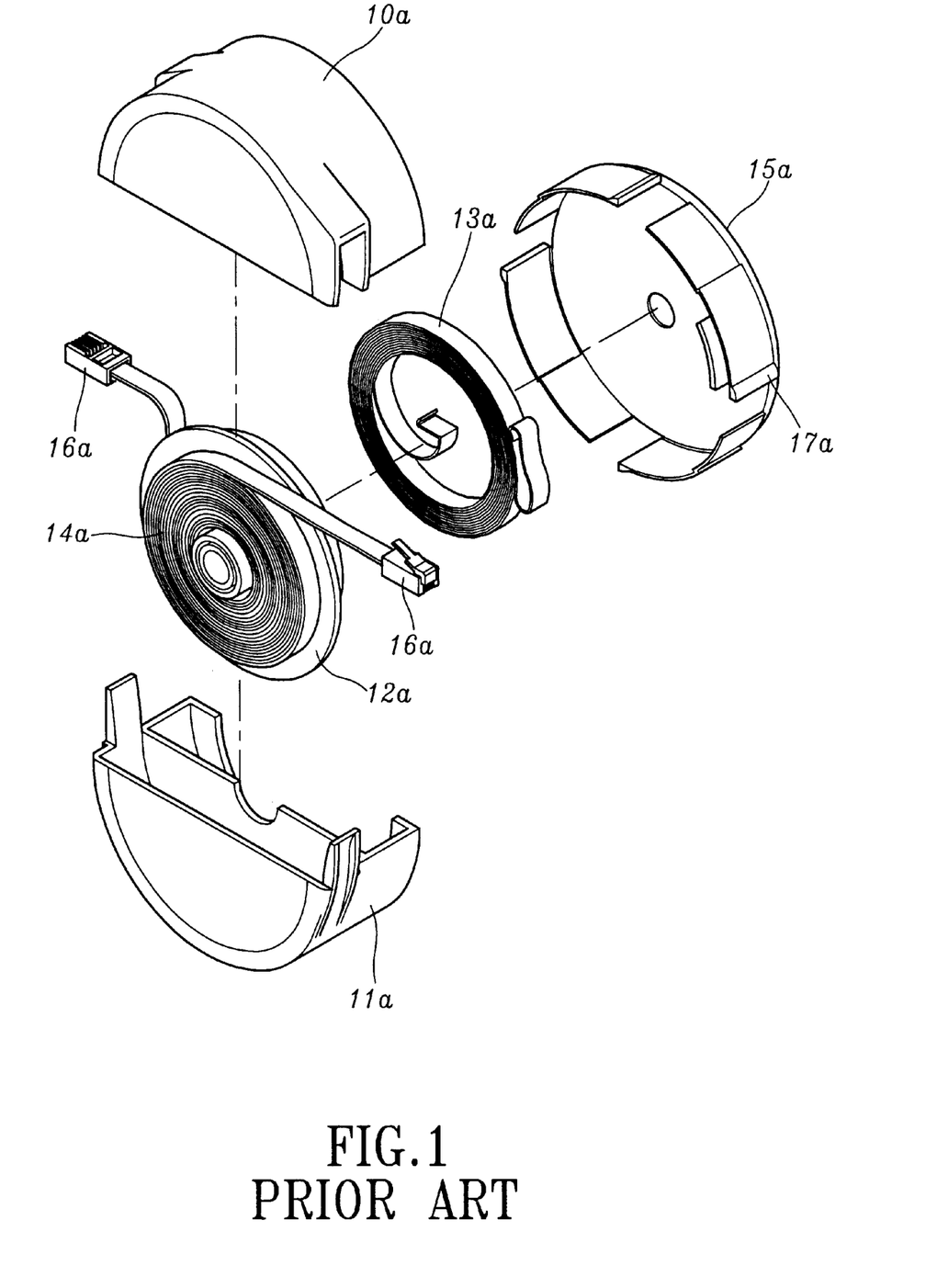
FIG. 1 is an exploded perspective view of a prior art communication line connecting box.

Prior art communication line connecting box is connected between a communication source and related information equipment and has a telescopic conductive wire. As shown in FIG. 1, the communication line connecting box includes a first case 10a, a second case 11a, a spacer 12a, a curled reed 13a, a conductive wire 14a and a check body 15a. The spacer 12a, curled reed 13a, conductive wire 14a and check wheel 15a are arranged within the first case 10a and the second case 11a. Two ends of the conductive wire 14a are connected to respective connectors 16a. Two ends of the conductive wire 15a are protruded out of the first case 10a and the second case 11a. Thereby, the two connectors are arranged outsides. By the power stored within the curled reed 13a, the conductive wire 14a is elastically stored within the first case 10a and the second case 11a for providing a telescopic conductive wire 14a. Moreover, by the two connectors 16a, the conductive wire is connected to a communication source or an information equipment.

A part of the check body may protrude out of the conductive wire 10a and the second case 11a. The check wheel 15a may be rotarily adjusted for properly tightening the curled reed 13a so as to provide a proper elasticity to the curled reed. Thus, two ends of the conductive wire 14a may be elastically stored within the cases 10a and 11a. A plurality of check bodies 17a is protruded from the check wheel 15a and wedge shape grooves (not shown) are installed within the first case 10a and the second case 11a. By the check bodies 17a and the wedge shape groove to form as a check structure, the check wheel 15a only rotates unidirectionally along the direction of tightening the curled reed 13a in order to prevent that the curled reed 13a to release power to push the check wheel 15a to rotate backwards to that the curled reed 13a will become loose. The aforementioned structure may refer to U.S. Pat. No. 5,230,481.

However, in the prior art communication line connecting box, the installation of the check wheel 15a is very complex. Thus, it is very difficult to be assembled and needs many labor hour. Also, the cost is increased.

SUMMARY OF THE INVENTION

The primary object of the present invention is to provide an improved structure of a communication line connecting box comprising a first case, a second case, a spacer, a curled reed, and a conductive wire. The check structure is integrally formed on the first case and the second case. The prior art check wheel is unnecessary in the present invention. Thus, the whole structure can be simplified greatly. Moreover, the assembly thereof is easy and the labor time is saved effectively and therefore, cost is reduced.

The various objects and advantages of the present invention will be more readily understood from the following detailed description when read in conjunction with the appended drawing.

DETAILED DESCRIPTION OF THE PREFERRED EMBODIMENTS

With reference now to FIGS. 2~5, an improved structure of a communication line connecting box of the present invention is illustrated. The improved structure of a communication line connecting box includes a first case 10, a second case 20, a spacer 30, a curled reed 41, and a conductive wire 50. The first case 10 is a round hollow case. One side thereof has an opening. The center within the first case 10 is formed with an axle body 11. The round periphery of the first case 10 is installed with a first through hole 12 and a second through hole 13. The opening of the first case 10 is integrally formed with a buckling body 14 and a plurality of check bodies 15.

Figure 2:
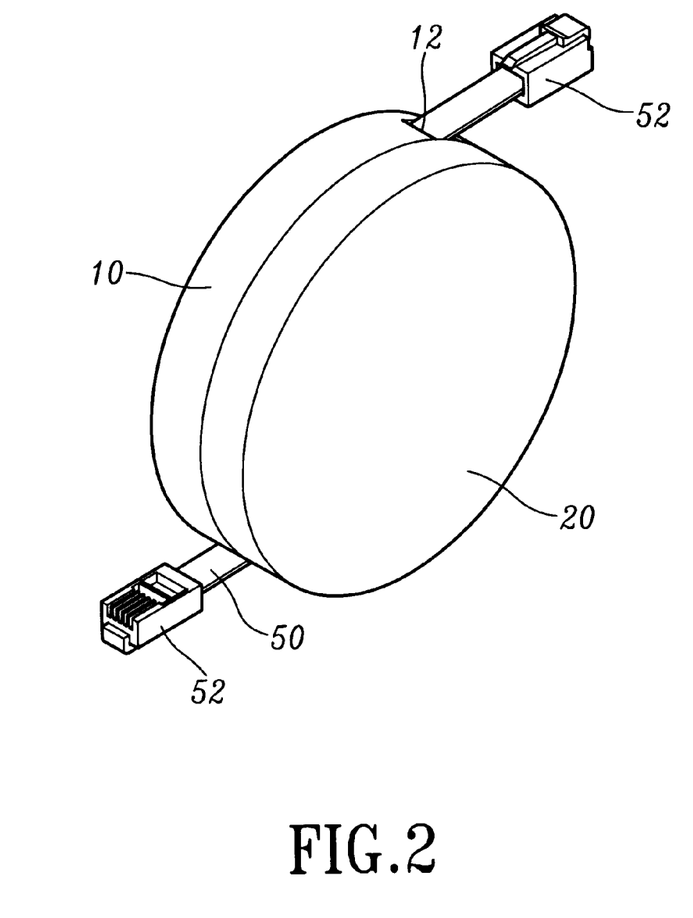
FIG. 2 is a perspective of the present invention.
Figures 3, 3A, 3B:
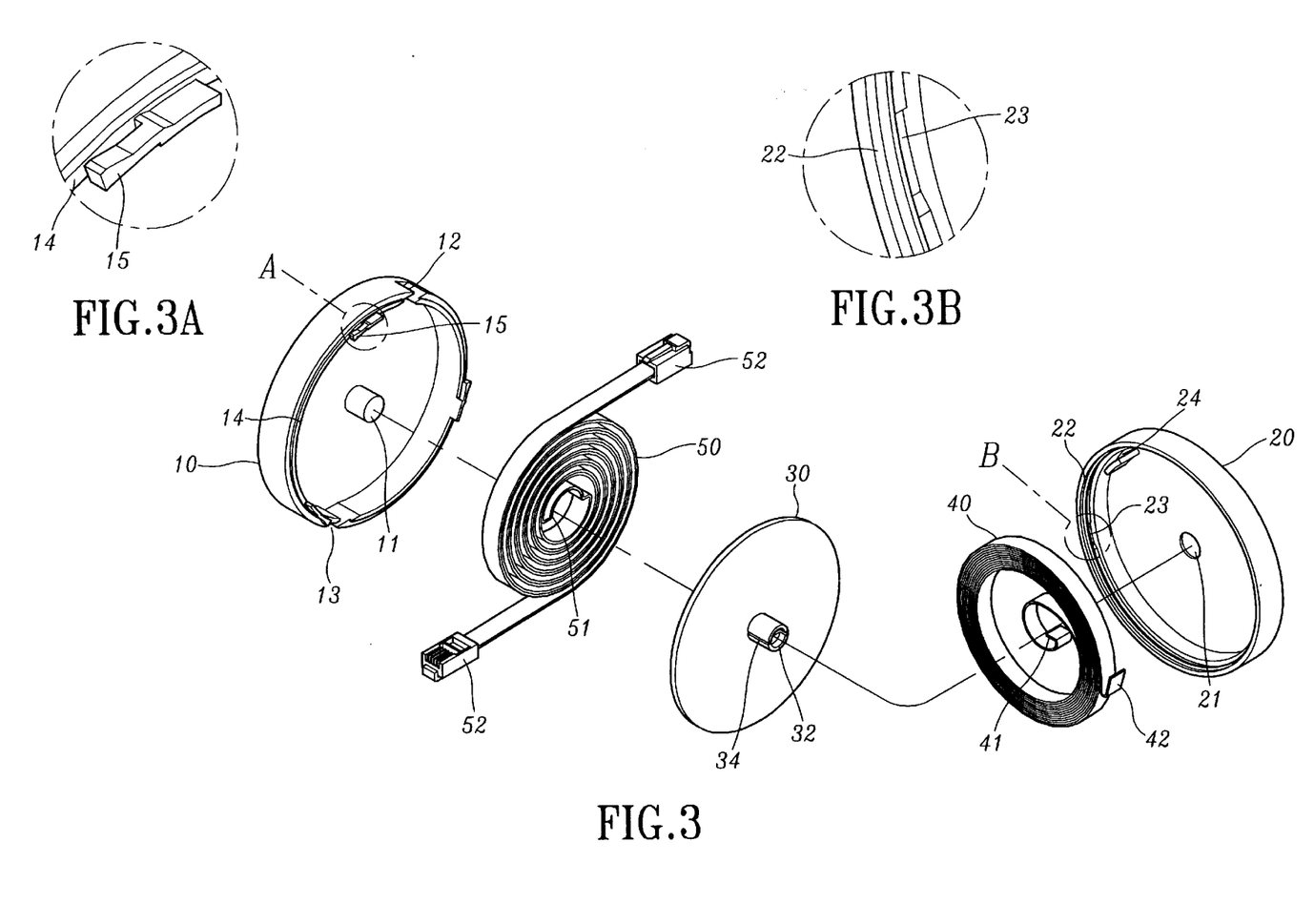
FIG. 3 is an exploded perspective view of the present invention.
FIG. 3A is an enlarged view of a portion of the structure shown in FIG. 3.
FIG. 3B is an enlarged view of another portion of the structure shown in FIG. 3.

The second case 20 is a round hollow case. One side thereof has an opening. The center of the second case 20 is installed with an axle hole 21. A buckling groove 22 is integrally formed on the opening of the second case 20 and a plurality of spaced wedge shape grooves 23 are installed. Inside the second case 20 is further installed with a gap 24. The second case 20 is installed with respect to the first case 10.

Figure 6:
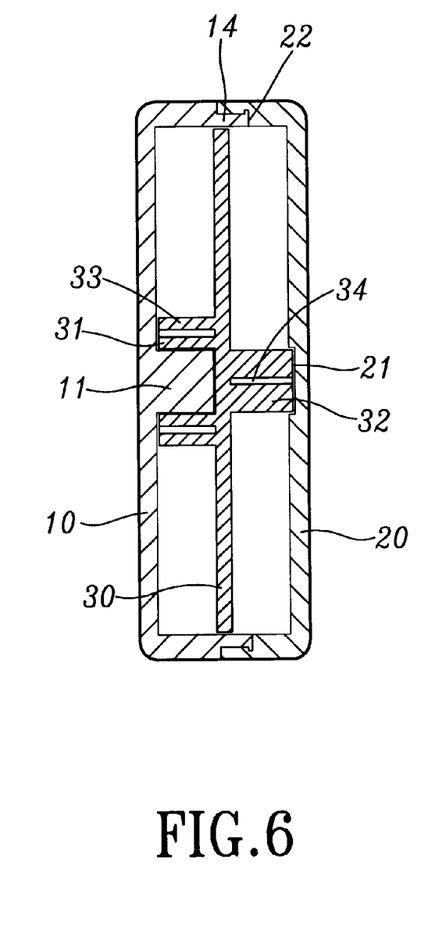
FIG. 6 is a cross sectional view showing the first case, second case, and spacer of the present invention.
Figure 7:
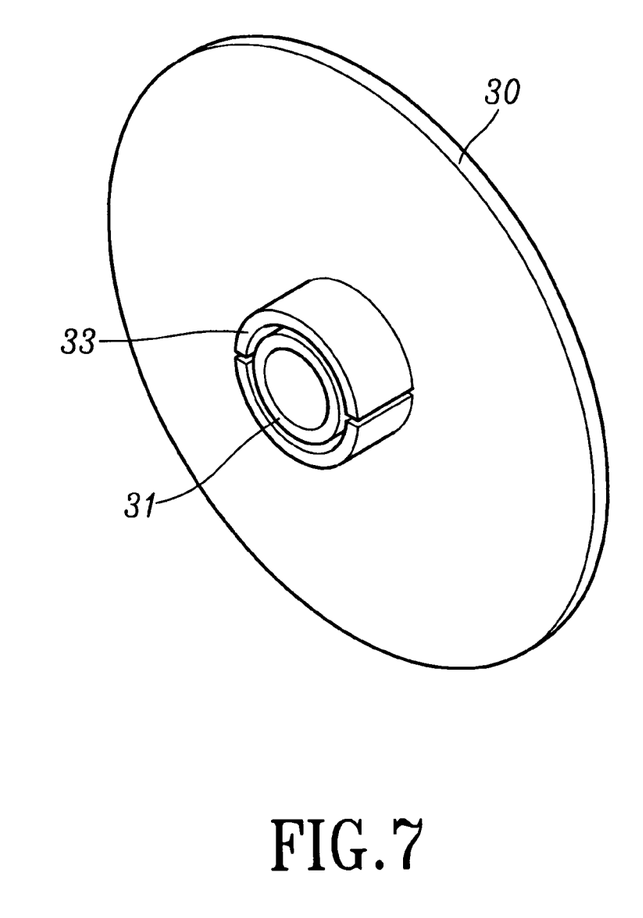
FIG. 7 shows the perspective view of the spacer according to the present invention.

The spacer 30 is a circular plate and is installed between the first case 10 and the second case 20. One the center of each side of the spacer is protruded with a sleeve 31 (as shown in FIGS. 6 and 7) and an axle body 32. A conductive wire pillar 33 is formed on the periphery of the spacer 31. A gap 34 is formed on the axle body 32.

The curled reed 40 is disposed between the spacer 30 and the second case 20. The curled reed 40 has an inner hook 41 and an outer hook 42. The inner hook 41 of the curled reed"

40 is embedded into the gap 34 of the spacer 30. The outer hook 42 of the curled reed 40 is embedded into the gap 24 of the second case 20. The axle body 32 of the spacer 30 matches with the axle hole 21 of the second case (as shown in FIG. 6) so that one side of the spacer 30 can be pivotally connected to the second case 20.

The conductive wire 50 is installed between the spacer 30 and the first case 10. The conductive wire 50 is folded in half and then is curled. The folded portion 51 covers the conductive wire pillar 33 of the spacer 30 so that the conductive wire 50 can be positioned on one side of the spacer 30. The sleeve 31 of the spacer 30 covers the axle body 11 of the first case (as shown in FIG. 6) so that another side of the spacer 30 is pivotally connected to the first case 10. The two ends of the conductive wire 50 are penetrated outwards through the first through hole 12 and the second through hole 13 of the first case. Therefore, two connectors 52 is arranged on the outside.

After the spacer 30, curled reed 40 and conductive wire 50 are assembled inside the first case 10 and second case 20, the buckling body 14 of the first case 10 and the buckling groove 22 of the second case 20 are connected with each other. Then they are combined by high frequency adhesion or thermal welding. Of course, the first case 10 and second case 20 can be combined by screwing or other ways. By the aforementioned structure, a an improved structure of a communication line connecting box according to the present invention is formed.

In the present invention, by the function of the curled reed 40, the conductive wire 50 can be curled so as to be stored within the first case 10 and the second case 20 so as to provide a telescopic conductive wire 50. Then, two connectors 52 is further used to be connected with a communication source and a information equipment.

Figure 4:
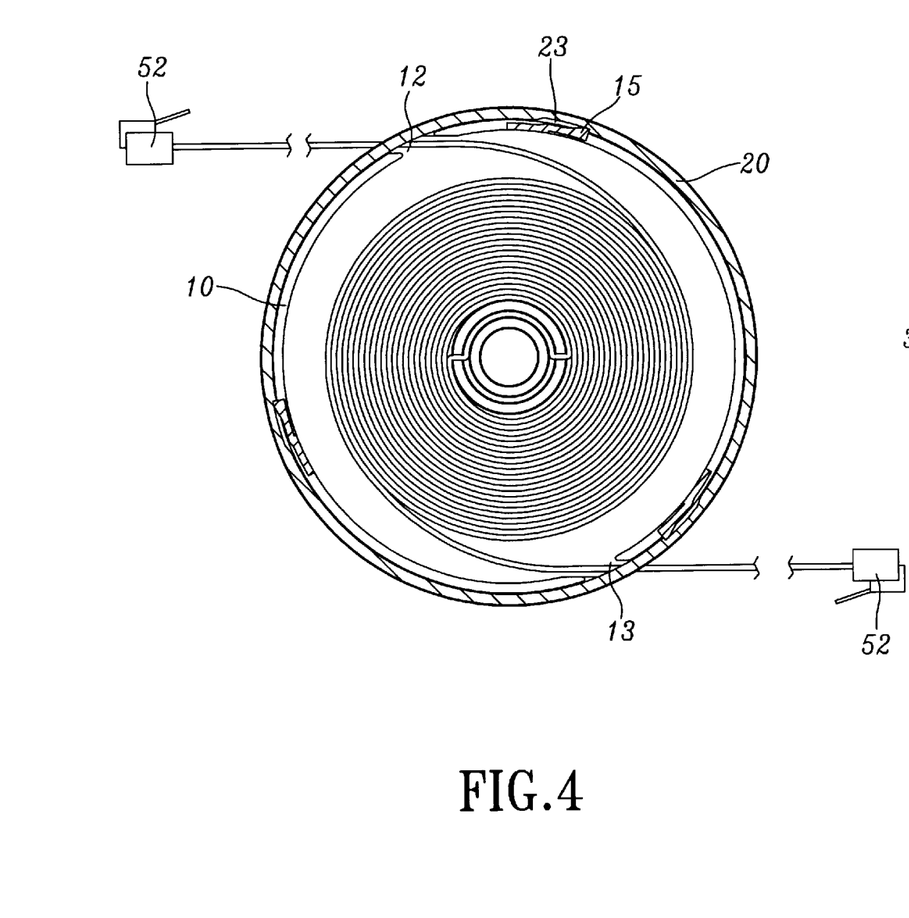
FIG. 4 is a cross sectional view showing that in the present invention, a conductive wire is installed within the case.
Figure 5:
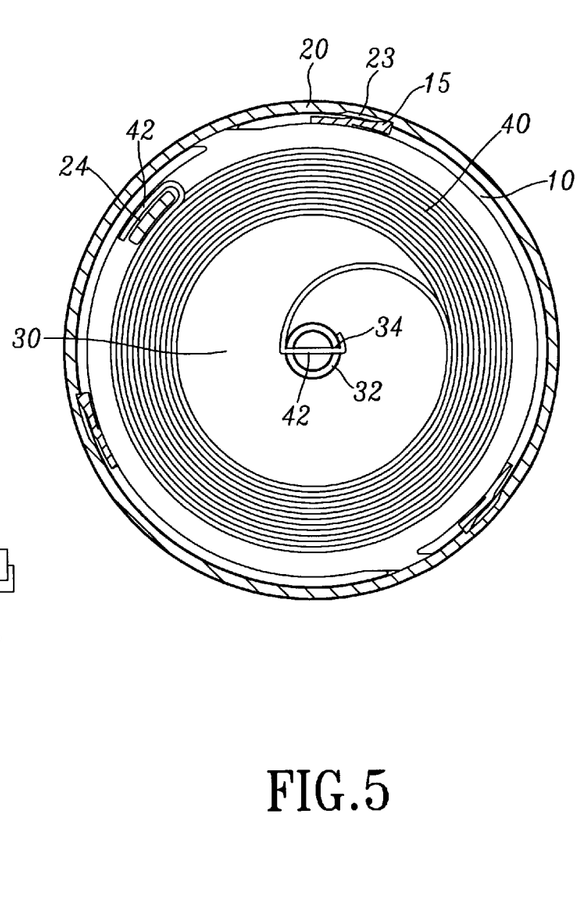
FIG. 5 is a cross sectional view showing that the curled reed according to the present invention is installed within the case.
Figure 8:
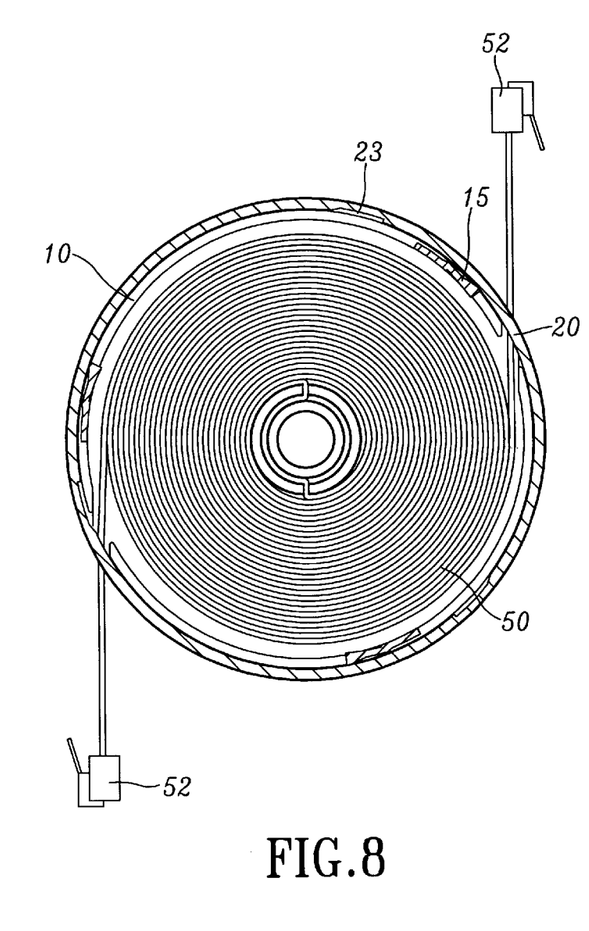
FIG. 8 is another cross sectional view showing that in the present invention, a conductive wire is installed within the case.
Figure 9:
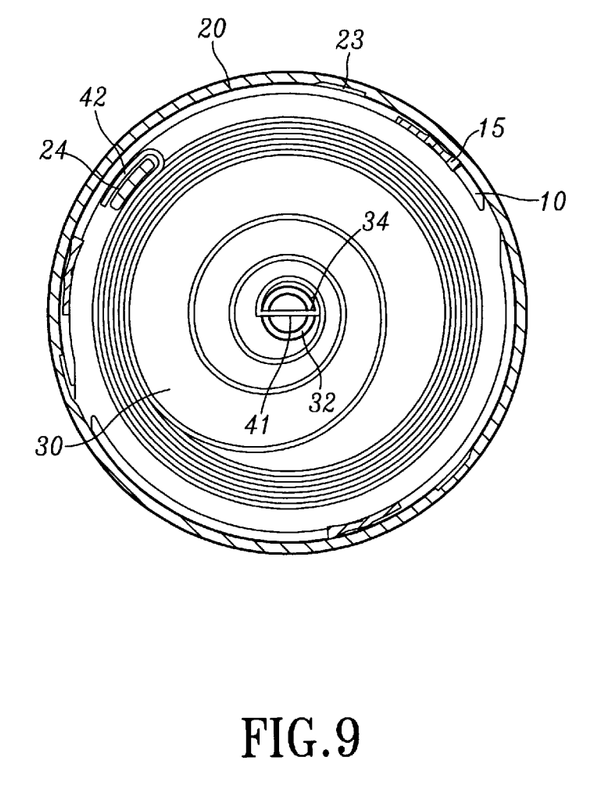
FIG. 9 is another cross sectional view showing that the curled reed according to the present invention is installed within the case.

Referring now to FIGS. 8 and 9, a check structure is formed by the combination of the check bodies 15 and the wedge shape grooves 23. Therefore, the first case 10 and the second case 20 only rotate unidirectionally for properly rotating the curled reed 40 so as to provide a proper elasticity to the curled reed 40. Thus, two ends of the conductive wire 50 is elasticity stored within the cases 10 and 20. As shown in FIGS. 4 and 5, as the curled reed 40 releases the power for pushing the first case 10 and the second case 20 to rotate in another direction. The check body 15 will buckle in the check grooves 23 to prevent that the first case 10 and second case 20 can not rotate in that direction so that the curled reed 40 is avoided to become loose.

Figures 10, 10A, 10B:
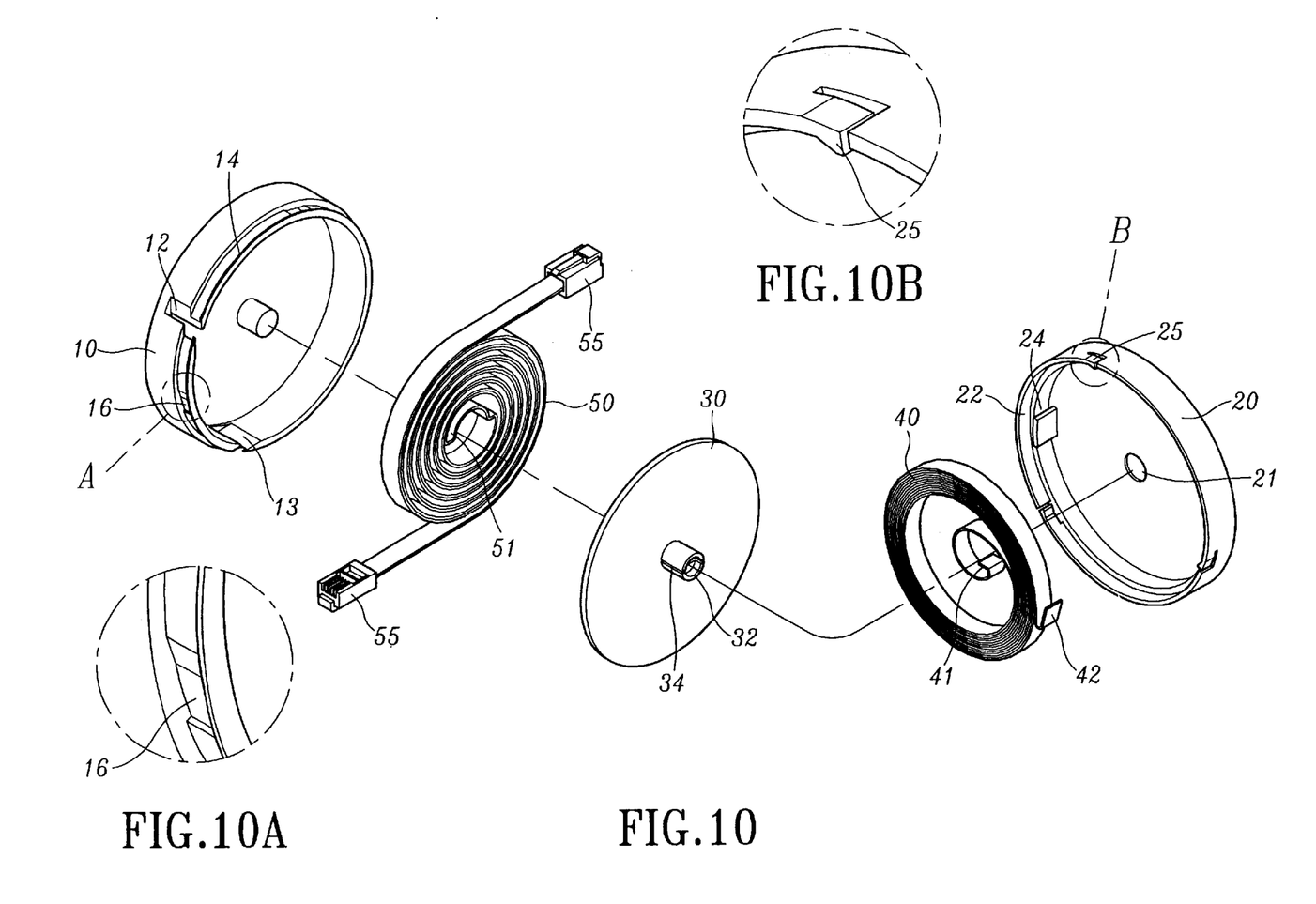
FIG. 10 is an exploded perspective view of another embodiment according to the present invention.
FIG. 10A is an enlarged view of a portion of the structure shown in FIG. 10.
FIG. 10B is an enlarged view of another portion of the structure shown in FIG. 10.

With reference to FIG. 10, a plurality of wedge shape grooves 16 may be further installed on the first case 10, and a plurality of check bodies 25 may be further installed on the second case 20, then a check structure is formed by the matching of the wedge shape grooves 16 and the check bodies 15.

In the present invention, the check structure is directly and integrally formed on the first case 10 and the second case 20. As a result, a prior art check wheel is not employed. Thus, the whole structure is simplified greatly and the present invention can be assembled easily so that labor time and cost are reduced effectively.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. A communication line storage apparatus comprising:
   (a) a housing having a first case section and a second case section coaxially coupled thereto in angularly displaceable manner, each of said first and second case sections having a substantially planar face and a substantially annular rim projecting transversely therefrom, said rim of said first case section having formed therein a plurality of through holes;
      at least one of said first and second case section rims having formed at a terminal edge portion thereof a buckling groove, the other of said first and second case section rims having formed at a terminal edge portion thereof a buckling body for lockingly engaging said buckling groove;
      at least one of said terminal edge portions having integrally formed thereon a plurality of radially protruding and resiliently deflectable check bodies angularly spaced one from the other, the other of said terminal edge portions having formed therein a plurality of radially recessed wedge shaped grooves angularly spaced one from the other for respectively engaging said check bodies;
   (b) a spacer coaxially disposed in angularly displaceable manner between said first and second case sections;
   (c) a resilient curled reed disposed between said spacer and said second case section, said curled reed having inner and outer hook ends coupled respectively to said spacer and said second case section; and,
   (d) a conductive wire having a pair of free end portions and a wound portion therebetween, said wound portion being disposed between said spacer and said first case section, each said free end portion passing through one said through hole of said first case section rim, each said free end portion terminating at a connector.

2. The communication line storage apparatus as recited in claim 1 wherein said check bodies are formed to protrude radially outward from said terminal edge portion of said first case section rim, and said wedge shaped grooves are formed in said terminal edge portion of said second case section rim, said wedge shaped grooves being recessed radially outward.

3. The communication line storage apparatus as recited in claim 1 wherein said check bodies are formed to protrude radially inward from said terminal edge portion of said second case section rim, and said wedge shaped grooves are formed in said terminal edge portion of said first case section rim, said wedge shaped grooves being recessed radially inward.

4. The communication line storage apparatus as recited in claim 1 wherein said first case section has formed projecting axially from said face thereof an axle body, and said second case section has formed on said face thereof a protrusion defining relative to said rim thereof a gap, said face of said second case section having an axle hole formed axially therethrough, said gap receiving said outer hook end of said curled reed.

5. The communication line storage apparatus as recited in claim 4 wherein said spacer includes substantially planar first and second surfaces on opposing sides thereof, said first surface having projecting therefrom an annular sleeve portion and an annular conductive wire pillar portion concentrically disposed one relative to the other, said second surface having projecting therefrom a split axle body having a transverse gap defined therethrough, said sleeve portion engaging said axle body of said first case section, said split axle body engaging said axle hole of said second case section, said transverse gap of said split axle body receiving said inner hook end of said curled reed.

6. The communication line storage apparatus as recited in claim 1 wherein said buckling body extends arcuately along said terminal edge portion of said first case section rim, and said buckling groove arcuately along said terminal edge portion of said second case section rim.

7. The communication line storage apparatus as recited in claim 1 wherein said first and second case sections are secured together by a screw fastener.

8. The communication line storage apparatus as recited in claim 1 wherein said first and second case sections are joined together by a high frequency adhered joint.

9. The communication line storage apparatus as recited in claim 1 wherein said first and second case sections are joined together by a thermally welded joint.

* * * * *